Nov. 7, 1944.　　　　R. P. CORTES　　　　2,362,190
APPARATUS FOR AMUSEMENT AND INSTRUCTION IN AVIATION
Filed Sept. 25, 1941　　　6 Sheets-Sheet 1

INVENTOR
RAFAEL PONCE CORTES, Deceased.
TERESA A. Vda de CORTES, Executrix.

BY 
ATTORNEY

Nov. 7, 1944.   R. P. CORTES   2,362,190
APPARATUS FOR AMUSEMENT AND INSTRUCTION IN AVIATION
Filed Sept. 25, 1941   6 Sheets-Sheet 2

INVENTOR
RAFAEL PONCE CORTES, Deceased.
TERESA A. Vda de CORTES, Executrix.
BY

ATTORNEY

INVENTOR
RAFAEL PONCE CORTES, Deceased.
TERESA A. Vda de CORTES, Exec.
BY
ATTORNEY

Fig. 16.

Patented Nov. 7, 1944

2,362,190

UNITED STATES PATENT OFFICE 2,362,190

APPARATUS FOR AMUSEMENT AND INSTRUCTION IN AVIATION

Rafael Ponce Cortés, deceased, late of Mexico City, Mexico, by Teresa A. Cortés, executrix, Mexico City, Mexico Application September 25, 1941, Serial No. 412,277

6 Claims. (Cl. 272—36)

This invention relates to new and useful improvements in Letters Patent No. 2,094,397, for an apparatus for amusement and instruction in aviation.

More specifically, the invention proposes a group of improved features for said apparatus.

One feature resides in the provision of a mechanism operable to balance each plane when passengers of different weights are in the plane and when some of the passengers are absent.

Another feature resides in the provision of a mechanism by which each suspended plane may make a complete turn on its longitudinal axis and may make partial turns on this axis without interrupting the passage of electric current to the motors of the planes, as will become clear as this specification proceeds.

Another feature resides in a mechanism for operating counterweights to counterbalance automatically the total weight of the passengers in each plane.

Still another feature resides in the provision of mechanism for limiting the ascending course and the descending course of the airplanes automatically controlled by the action of a certain platform.

Another feature resides in a mechanism which includes safety belts and which controls certain turns of the airplanes.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure.

The apparatus for amusement and instruction in aviation, in accordance with this invention, includes a revolving structure 20 having a central post 21 and a support 22 radially spaced from the central post 21. The support 22 is mounted along the periphery of a disc shaped platform 23. This platform is supported by a plurality of wheels 24 working on a circular track 25. A horizontal brace 26' is connected between an upper portion of the post 21 and the support 22. Further details of the revolving structure will not be given in this specification as it forms no part of the invention. However, it should be clearly understood that the revolving structure 20 is capable of controlled turning by some prime mover, not illustrated on the drawings.

A radially extending arm 26 is pivotally mounted intermediate of its ends by a pintle 27 mounted on the support 22. The arm 26 is stiffened by a vertical brace 28 projecting from the intermediate area having the pintle 27, and a plurality of brace cables 29 connected between the end of the brace 28 and certain points along the radial arm 26.

Figure 14:
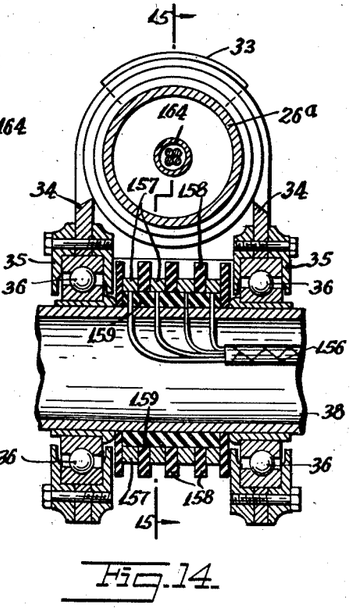
Fig. 14 is a fragmentary enlarged sectional view taken on the line 14—14 of Fig. 10.
Figure 15:
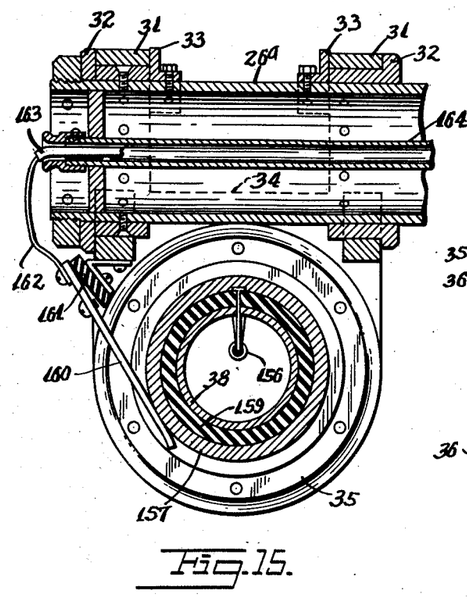
Fig. 15 is a fragmentary vertical sectional view taken on the line 15—15 of Fig. 14.
Figure 16:
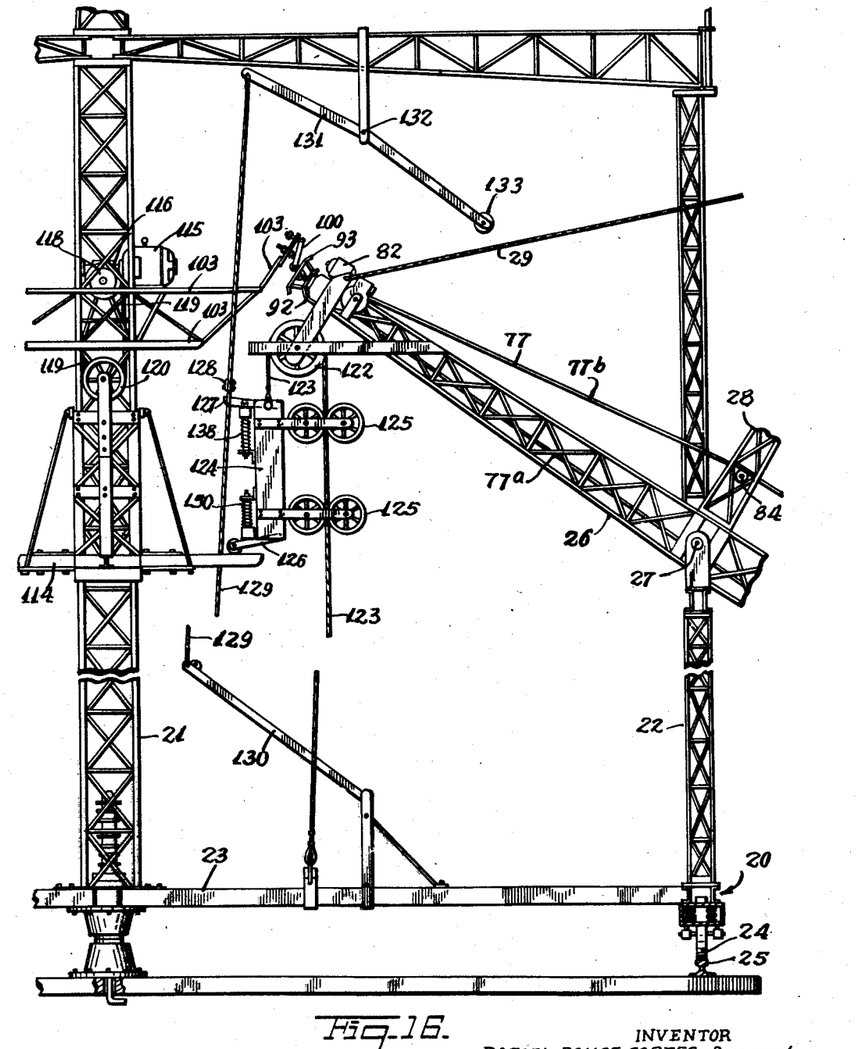
Fig. 16 is a fragmentary enlarged detailed view of a portion of Fig. 1.
Figure 17:
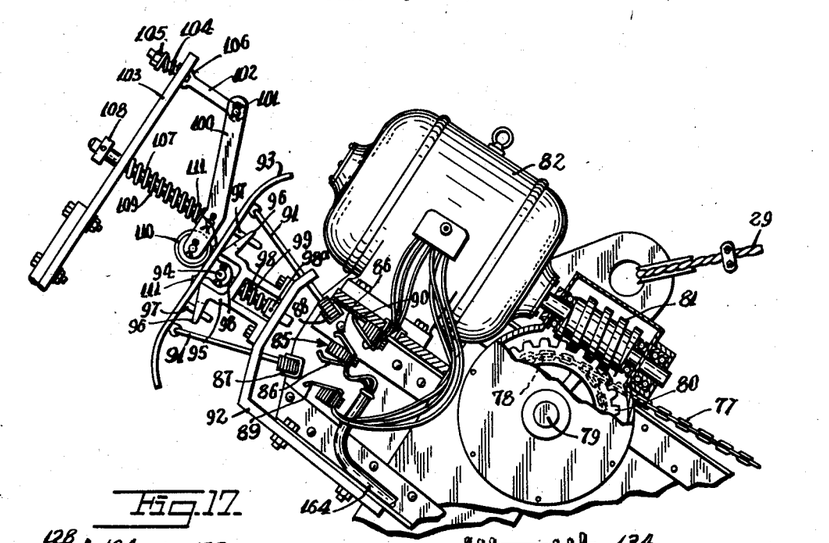
Fig. 17 is a fragmentary enlarged detailed view of a portion of Fig. 16 but showing certain parts broken away to disclose interior parts.
Figure 18:
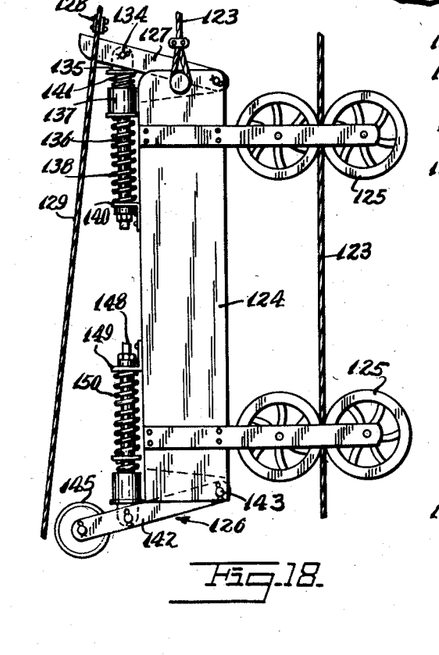
Fig. 18 is a fragmentary enlarged detailed view of a portion of Fig. 16.
Figure 19:
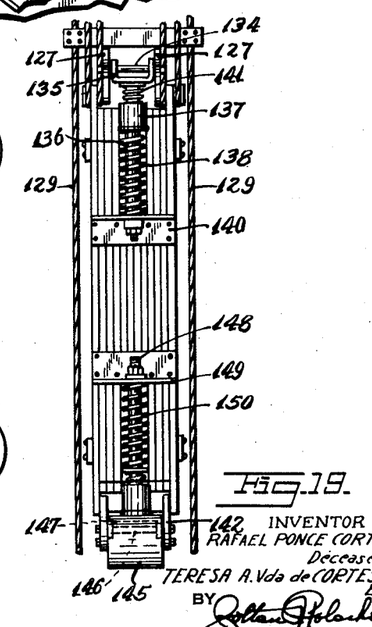
Fig. 19 is an elevational view of Fig. 18 looking from the left side.

A saddle 30 (see Figs. 3 and 10) is coaxially turnably mounted on the outer end of the arm 26. More specifically, the arm 26 has a tubular portion 26a at its extremity upon which the saddle 30 is turnably mounted. The saddle 30 includes a pair of spaced straps 31 which are turnably mounted on bushings 32 mounted upon the tubular portion 26a. A pair of brackets 33 are mounted on the tubular portion 26a adjacent the inner edges of the straps 31 and prevent the straps from coming off the bushings 32. These brackets 33 extend over an angular distance of approximately 90°, across the top of the tubular portion 26a. The straps 31 are connected with wall portions 34 (see Figs. 14 and 15) which are adapted to abut the ends of the brackets 33 when the saddle 30 is turned upon the tubular portion 26a. More specifically, the arrangement is such that the saddle 30 may be turned 90° in one direction and 90° in the other direction. This may be easily understood by an examination of Figs. 14 and 15. The saddle 30 supports a pair of depending brackets 35 which in turn support a pair of spaced ball bearings 36. These ball bearings are arranged so that their axes are in alignment with each other, and at right angles to the axis of the tubular portion 26a.

An airplane body 37 for passengers is provided with the usual controls for aerial acrobacy such as banking, barrel turning, etc., and is provided with a fixedly mounted tube 38 extending along its longitudinal axis in the vicinity of its center. The airplane body 37 is also provided with an electric motor driven propeller 39 at its front. The ball bearings 36 comprise means for rotatively supporting the tube 38 at right angles to the outer end of the arm 26 and through the saddle 30. More specifically, the tube 38 extends coaxially through and is rotatively supported by the bearings 36. The tube 38 is fixedly mounted within the airplane body 37 by being mounted on transverse frame sections 40, 41 and 42 of the airplane body 37.

The airplane 37 has the usual wings 42 with the usual ailerons 43, a tail 44, a rudder 45, etc. The airplane body is also provided with the usual control mechanism for operating the ailerons, tail, rudder, etc., of the airplane body in a conventional manner, not disclosed in detail upon the drawings since such constructions are old and form no part of this invention. However, it should be realized that when the amusement and instruction apparatus is in use the various controls may be operated to cause the airplane body to go through various acrobatic maneuvers such as banking, barrel turns, etc., as will become clear as this specification proceeds.

It should be noted that the airplane body 37 is capable of turning coaxially of the tube 38, since the tube 38 is rotatively supported by the bearings 36 of the saddle 30. Moreover, it should be noted that the airplane body 37 may turn upon an axis coinciding with the axis of the tubular portion 26a, through a limited distance as controlled by the walls 34 engaging the ends of the brackets 33. Normally, before the time that the apparatus is set into operation, the airplane body rests upon a platform 46 which may be lowered and which may be referred to as a descending platform. This platform normally supports the airplane body 37 when it is in its raised position. The platform 46 is mounted on the upper ends of a group of support bars 47 which are turnably mounted in a base 48. A plurality of stops 49 are mounted on the base 48 to the front sides of the bars 47 to prevent them from pivoting further forwards than their vertical positions. However, the bars 47 may pivot rearwards so that the platform 46 may move rearwards in the direction of the arrow, indicated by reference number 50 in Fig. 6.

The platform 46 is normally locked in its raised forward position by a latch device which includes a bar 51 pivotally supported at its bottom end by a pintle 52. This bar extends upwards and forwards. A manually operable latch 53 is mounted on the platform 46 and engages the front of the bar 51 to hold the platform 46 from moving rearwards under the force of gravity. The bar 51 is urged into a normal upwardly extended position by an expansion spring 54. A handle 55 is connected with the bar 51 and extends upwards to the vicinity of one of the passengers or plane attendant so that the passenger or plane attendant may move the handle 55 to depress the bar 51 so that it disengages the latch 53. Then the platform 46 will fall rearwards in the direction indicated by the arrow 50. Thus the platform 46 descends. The platform 46 is caused to move rearwardly and downwardly after the passengers are seated in the airplane body 37 and before the airplane body moves upwards for balancing the airplane body in position on the end of the arm 26 as will be hereinafter described.

Means is provided for balancing the airplane body 37 about the outer end portion of the arm 26. This means includes a pair of parallel rods 56 and 57 fixedly mounted within the airplane body 37 and extending longitudinally thereof. A weight 58 is slidably mounted on the rods 56 and 57. A cable 59 is attached to the weight 58 and extends rearwards and engages over a pulley 60. This cable is attached to a chain 61 which extends forwards and engages over a sprocket wheel 62 fixedly mounted on a shaft 63. The chain 61 after extending over the sprocket 62 is attached to a pin 64 mounted on the weight 58. The shaft 63 is rotatively supported in a bearing 65. An annular member 66 is fixedly mounted by several brackets 67 upon a stationary portion of the airplane body 37.

The annular member 66 is coaxially located upon the shaft 63. The annular member 66 is provided with a plurality of apertures 68 extending around its perimeter. A lock pin 69 is mounted upon an arm 70 fixed on the shaft 63. The lock pin 69 is urged into engagement with one of the apertures 68 by an expansion spring 71. The outer end of the lock pin 69 is provided with a knob 72 by which it may be gripped and pulled outwards. The outer end of the shaft 63 is provided with a square portion 73 to receive a socket wrench or other turning tool.

Figures 5, 6, 11, 12, 13:
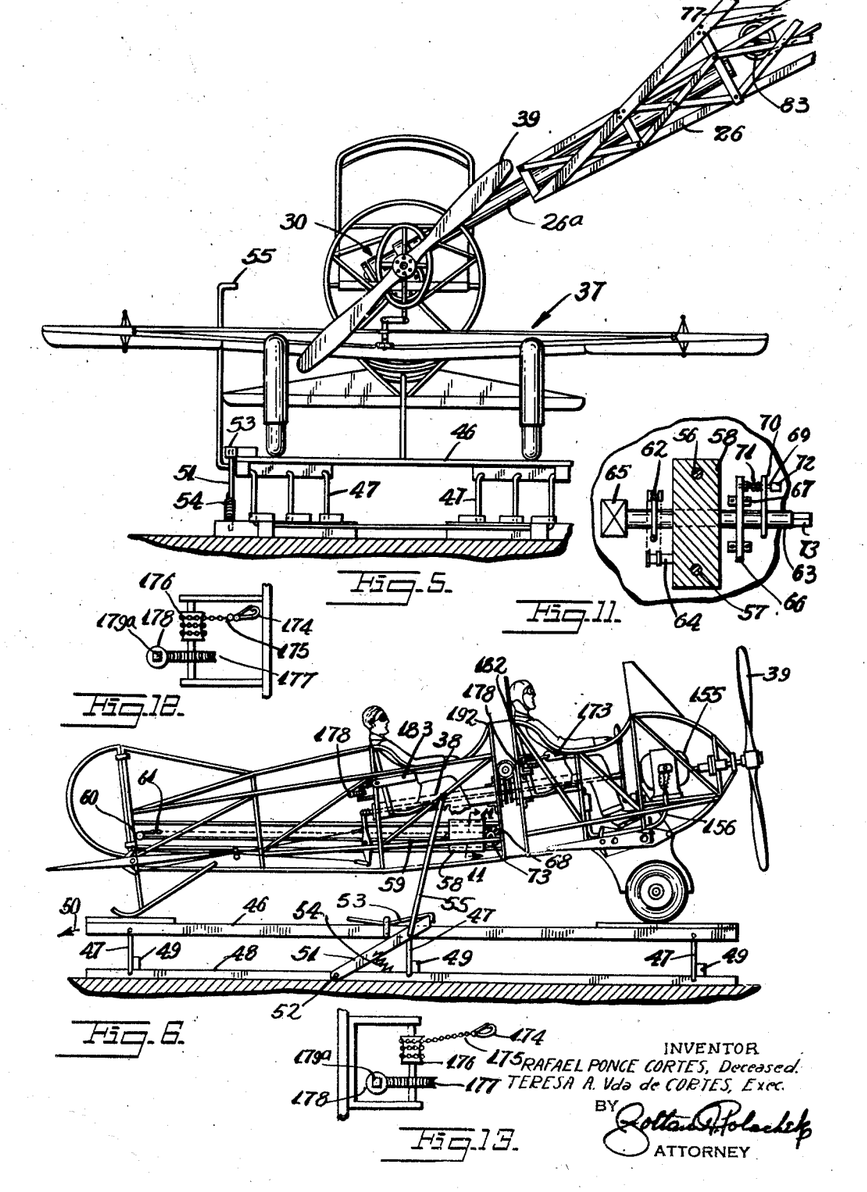
Fig. 5 is a front elevational view of the plane shown in Fig. 3.
Fig. 6 is a side elevational view of the plane shown in Fig. 3 with the covering of the plane removed so that interior parts may be seen.
Fig. 11 is a fragmentary enlarged sectional view taken on the line 11—11 of Fig. 6.
Fig. 12 is a fragmentary enlarged detailed view of a portion of Fig. 6.
Fig. 13 is a fragmentary enlarged detailed view of another portion of Fig. 6.

When the descending platform 46 is lowered the airplane body 37 will pivot about the arm 26, depending upon its balance. For example, if the rear passengers, as illustrated in Fig. 6, are lighter than the front passengers the rear portion of the airplane body will pivot upwards. An operator of the device balances the airplane body by engaging a turning tool on the socket 73 and turning the shaft 63 so as to move the chain 61 to move the weight 58 rearwards. When the airplane body is suitably balanced the pin 69 is reengaged with one of the apertures 68 to lock the weight 58 in its new position.

Means is also provided for automatically balancing the airplane body 37 and its load of passengers about the pivot 27 of the arm 26. This automatic means may best be understood from an examination of Figs. 1, 2, 16 and 17. It is characterized by a pair of parallel rods 75 extending longitudinally along inside of the arm 26 and slidably supporting a weight 76 which is adapted to move forwards and rearwards on the rods 75 to accomplish the balancing. This weight 76 is moved by an endless chain 77. The chain 77 has a side portion 77ª extending longitudinally through the arm 26 and engaging over a wheel 78 mounted coaxially on a shaft 79 which is provided with a gear 80 meshing with a worm gear 81 mounted on the shaft of a controlling motor 82.

The chain 77 also extends over a wheel 83 rotatively mounted upon the front portion of the arm 26. The chain 77 has a side portion 77ᵇ which extends externally along the arm 26. An idler roller 84 is mounted on the brace 28 for suitably holding the chain 77 tensioned. The ends of the chain 77 are connected to the opposite ends of the weight 76. The arrangement is such that the electric motor 82 may turn in one direction to move the weight 76 rearwards along the arm 26, or may turn in the other direction to move the weight 76 forwards along the arm 26.

The motor 82 is controlled by a reversing switch 85. This switch has central live poles 86, bridging contacts 87 and 88, and cooperative opposed contacts 89 and 90. The bridging contacts 87 and 88 are mounted upon the ends of a pair of rods 91 which are slidably supported in a bracket 92 mounted on the arm 26. The rods 91 are pivotally connected on the opposite end portions of a bar 93 which is pivotally connected at its center with a pintle 94 to a rod 98 slidably mounted on a bracket 95 mounted on the bracket 92. The bracket 95 supports the bar 93 and has side projecting portions 96 through which guiding pins 97 mounted on the bar 93 slidably pass. A spring 99 coaxially mounted on the rod 98 acts between bracket 95 and a collar 98ª pinned on rod 98 for urging the rod 98 inwards to hold the bar 93 across the bracket 95. An arm 100 is pivotally supported at its outer end by a pintle 101 on a resiliently supported arm 102 which is mounted on a bracket 103 which is fixedly mounted on the post 21. The rod 102 slidably engages through the bracket 103. A spring 104 is coaxially mounted on the free end of the rod 102 and acts between a bolt 105 and the bracket 103 to resiliently urge the rod 102 inwards so that projecting portions 106 thereof engage the bracket 103.

The arm 100 has a rod 107 pivotally connected near its free end. This rod 107 slidably passes through the bracket 103. Its free end is provided with a collar 108 to prevent complete disengagement of the rod 107 from the bracket 103. An expansion spring 109 is mounted upon the rod 107 and acts between the bracket 103 and the arm 100 to urge the arm outwards. The free end of the arm 100 is provided with a roller 110 which normally rests against the central portion of the bar 93. The bar 93 has a pair of small projections 111 arranged a short distance on opposite sides of its center over which the roller 110 must pass when the arm 26 pivots upwards or downwards.

An elevator 114 is vertically slidably mounted on the post 21. Means is provided for raising and lowering this elevator. This means includes an electric motor 115 fixedly mounted on the post 21 and having its shaft provided with a worm 116 driving a worm 117 which controls a drum 118 provided with a cable 119 extending downwards and beneath a wheel 120 supported on the elevator 114. The cable 119 then extends upwards and has its free end attached to the side of the post 21. The arrangement is such that the electric motor 115 may be operated to indirectly let out cable 119 which will then cause the platform 114 to move downwards. Similarly, the electric motor 115 may draw in the cable to raise the platform 114.

An arrangement is provided which causes the arm 26 to follow the lead of the platform 114. This arrangement includes a pulley 122 mounted upon the inner end of the arm 26. A cable 123 passes over the pulley 122. The bottom end of the cable 123 is fixedly mounted on the platform 23. The other end of the cable 123 connects with a counterweight 124. Several guide pulleys 125 are mounted on the counterweight and engage the cable 123 to steady the travel of the counterweight.

The counterweight 124 has a resiliently mounted bottom bumper 126 which is adapted to rest upon the platform 114 or to resiliently strike the platform when the platform 114 is raised.

Means is also provided for limiting upward motion of the counterweight 124. This means includes a pair of fingers 127 mounted on the counterweight 124 and extending laterally. These fingers 127 are adapted to strike a bar 128 mounted across a pair of cables 129. The cables 129 are attached at their bottom ends upon a stationary support bracket 130 mounted on the platform 23. At their top ends the cables 129 are attached to an arm 131 which is pivotally supported at its center by a pintle 132 and which is provided with counterweights 133. The fingers 127 are resiliently arranged. A pin 134 connects the fingers 127. This pin supports a yoke 135 which is mounted upon a rod 136 slidably supported in a bushing 137. An expansion spring 138 is coaxially arranged on a rod 136 which is supported on a bracket 140 mounted on the counterweight 124. Another spring 141 is also slidably arranged on the rod 136 and is located above the bushing 137. The springs 138 and 141 serve to resiliently hold the fingers 127.

The bumper 126 also comprises a pair of fingers 142 which are pivotally mounted at the points 143 and which extend downwards. A roller 145 is mounted between the fingers 142. The fingers 142 are connected by a pin 146 across which a yoke 147 is mounted. A rod 148 is mounted on this yoke and extends upwards through a bracket 149 mounted on the side of the counterweight 124. A spring 150 is coaxially arranged on the rod 148 and acts to resiliently urge the fingers 142 downwards.

When the inner end of arm 26 moves downwards the arm 100 moves over the top projection 111. Then the wheel 110 will pivot the bar 93 so that the contact 88 engages in between the contacts 86 and 90. This closes the circuit through the electric motor 82 so as to drive the motor in a direction in which the weight 76 move outwards on the arm 26. This causes the outer end of the arm 26 to move downwards. When the outer end of arm 26 moves upwards so that the inner end moves downwards and bar 93 rides clear of the roller 110, the spring 99 straightens out the bar 93 so that the switch 85 is open.

When the descending platform 46 is lowered the airplane body 37 may move downwards if the passengers exceed a certain weight. This is automatically corrected, since if the outer end of the arm 26 moves downwards its inner end will move upwards so that the bottom end of the bar 93 will strike the roller 110 causing the bar 93 to pivot so that the bridging contact 87 will engage in between the contacts 85 and 86. This will cause the motor 82 to rotate moving the weight 76 inwardly on the arm 26 until the arm 26 and its load is balanced. In the balanced position the automatic control will be in the neutral position shown in Fig. 17.

The airplane body 37 is provided with an electric motor 155 for driving the propeller 39. This electric motor 155 receives current from a cable 156. The cable 156 extends into the tube 38 and connects with several contact rings 157 mounted on the outside of the tube 38. These contact rings are separated from each other by insulation material 158. The contact rings 157 are also mounted on an insulation bushing 159 which is mounted on the tube 38. Each contact ring 157 is engaged by a brush 160.

These brushes are mounted on an insulation bar 161 mounted on the saddle 30 of the device. The brushes 161 connect with leads 162 which form a cable 163 which extends through a pipe 164 supported along the interior of the tubular portion 26a of the arm 26. Thus the cable 163 extends to the live terminals 86 (see Fig 17). The arrangement is such that electric current may reach the electric motor 155 without interfering with the aerial acrobacy of the airplane body. Even though the airplane body makes a barrel turn, or banks, or the saddle 30 pivots on the arm 26, the current may always pass from the brushes 160 to the contacts 157 and then to the electric motor.

A safety belt is also provided for each of the passengers and these safety belts are associated with means for locking the airplane body 37 from making barrel turns while said safety belts are loose. More specifically, the airplane body 37 is shown provided with a pair of front seats 166 for two front passengers, and a pair of rear seats 167 for two rear passengers. A bolt 168 is mounted on the airplane body between the two front seats 166. This bolt is resiliently urged rearwards by a spring 169 which acts between a collar 170 mounted on the bolt and a stationary portion 171 such as a portion of the airplane body 37. The front end of the bolt 168 is provided with an eye portion 172 through which the safety belt 173 passes. The safety belt 173 has its end portions extending to the sides and is adapted to engage around the mid sections of the two front passengers. The ends of the safety belt 173 are adapted to be connected with hooks 174 mounted upon the ends of chains 175 which are wound around drums 176 located at the sides of the seats 166.

These drums 176 are coaxially mounted with worm wheels 177 meshing with worms 178 mounted upon a shaft 179 rotatively supported by several bearings 180. The shaft 179 has one end 179a projecting and formed with a square portion adapted to receive the socket of a turning tool.

Figures 1, 2:
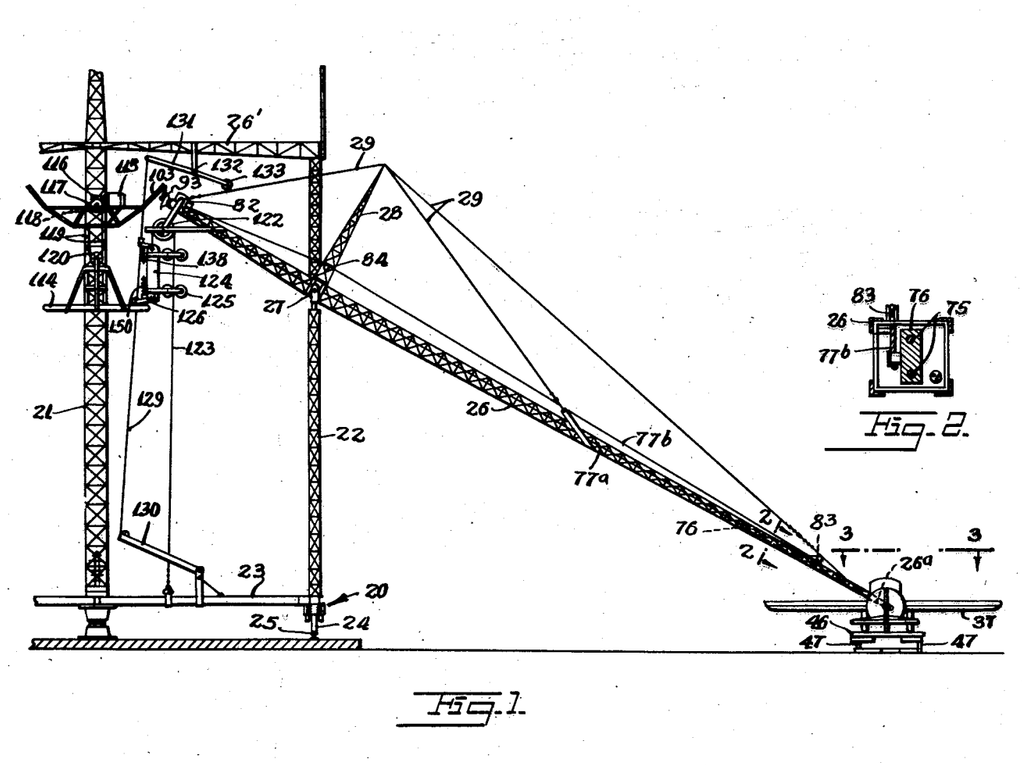
Fig. 1 is a fragmentary side elevational view of an apparatus for amusement and instruction in aviation constructed in accordance with this invention.
Fig. 2 is a fragmentary vertical sectional view taken on the line 2—2 of Fig. 1.
Figures 3, 4, 7, 8:
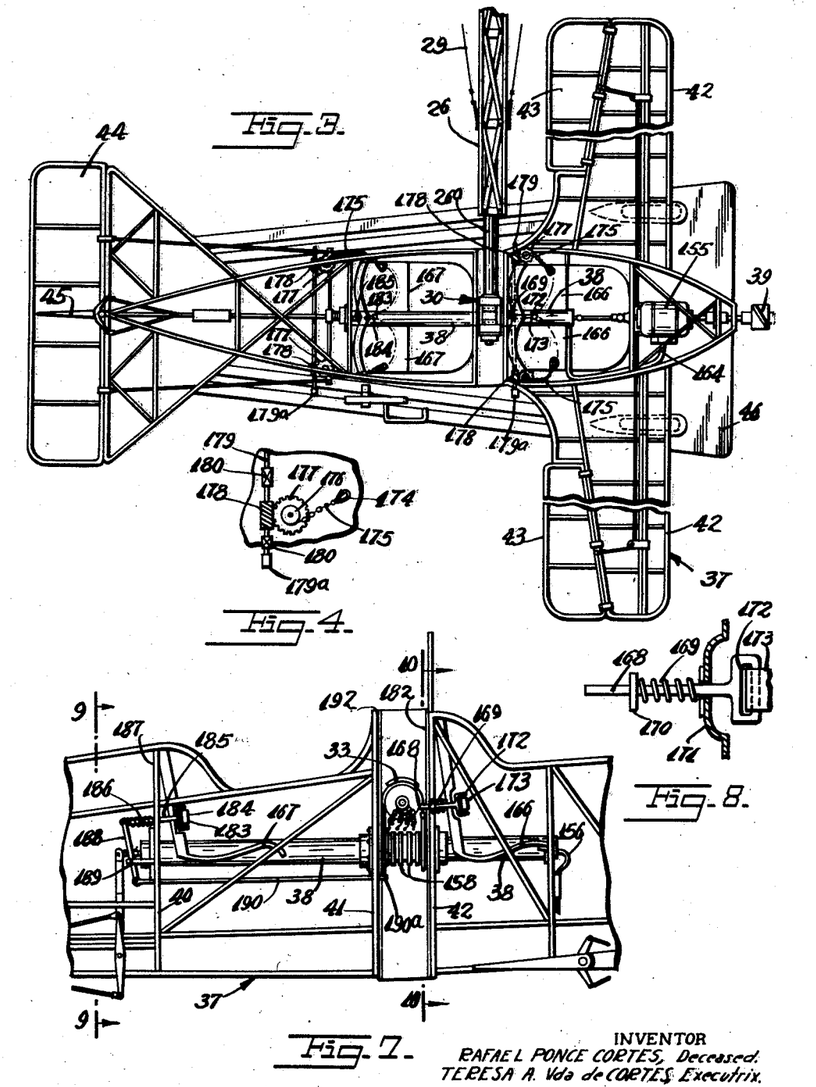
Fig. 3 is a fragmentary enlarged plan view of a portion of Fig. 1 looking in the direction of the line 3—3 thereof.
Fig. 4 is a fragmentary enlarged detailed view of a portion of Fig. 3 showing particularly one of the chains which engages a safety belt of one of the passengers.
Fig. 7 is a fragmentary enlarged detailed view of a portion of Fig. 6.
Fig. 8 is a fragmentary enlarged sectional detailed view of a portion of Fig. 7.
Figure 10:
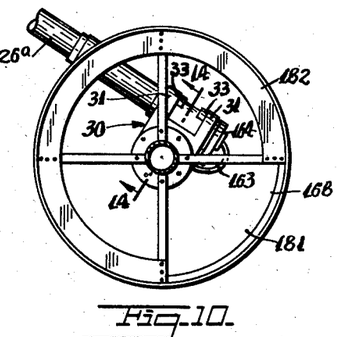
Fig. 10 is a fragmentary transverse sectional view taken on the line 10—10 of Fig. 7.

Normally, when the safety belt 173 is loose, the bolt 168 is urged rearwards by the spring 169 so that its rear end engages within a 90° arcuate space 181 formed in an annular section 182 fixedly mounted on the saddle 30 (see Figs. 7 and 10). Thus, while the bolt 168 is operative the airplane body 37 may only turn through 90°. When the safety belt 173 is properly tightened the bolt 168 is drawn forwards, compressing the spring 169 until its rear end disengages from the 90° arcuate opening 181. Then the airplane body is free to do barrel turns in so far as the front safety belt is concerned. However, the rear safety belt will still lock the airplane body unless it is also suitably tensioned.

Figure 9:
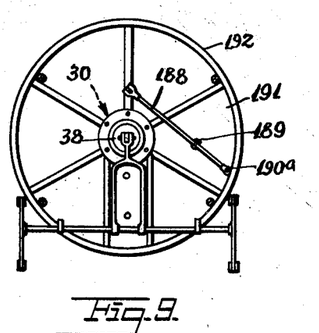
Fig. 9 is a fragmentary transverse sectional view taken on the line 9—9 of Fig. 7.

The rear seats 167 are provided with a safety belt 183 which has its center passing through the eye 184 of a bolt 185 which is slidably mounted between the seats 167. This bolt 185 is urged rearwards by a spring 186 coaxially mounted on the bolt and acting between a portion 187 of the airplane body and an end portion of the bolt 185. The rear end of the bolt 185 pivotally connects with a lever 188 which is pivotally mounted intermediate of its ends by a pintle 189. The other end of the lever 188 connects with a bolt 190 which extends forwards and is slidably supported. The front end 190a of the bolt 190 engages within a 60° segment 191 of a transverse section 192 which is fixedly mounted on the saddle 30 (see Figs. 7 and 9).

The ends of the safety belt 183 are adapted to be engaged with hooks 175 of the chains 174 which engage drums 176 coaxially fixedly connected with worm wheels 177 meshing with worms 178 on a shaft 179 rotatively supported by bearings 180 and having a projecting end 179a adapted to be engaged by a turning tool. The arrangement is such that a caretaker of the device may turn the shaft 179 to properly tension the safety belt 183 about the bodies of the rear passengers so that the bolt 185 is drawn forwards, pivoting the lever 188 and withdrawing the bolt 190 so that its front end 190a disengages from the segment 191 of the section 192. The airplane body 37 is then free to make barrel turns.

A brief review of the operation of the device is as follows:

Normally, when the device is not in operation the platform 46 is in a raised position as illustrated in Fig. 6, and the arm 26 is directed downwards so that the airplane body 37 is resting on the platform 46. The airplane body is now ready to receive passengers, as schematically shown in Fig. 6. The safety belts 173 and 183 are now engaged about the passengers so as to indirectly move the bolts 190 and 168 to be free from the sections 182 and 192 of the saddle 30 to release the airplane body 37 so that it may make barrel turns.

The platform 46 is then lowered. The airplane body 37 will pivot upon the end of the arm 26, depending upon the relative weights of the front and rear passengers. The counterbalance 58 is then shifted by engaging a turning tool on the square end 73 of the shaft 63 so as to properly balance the airplane body. The counterweight 76 will be automatically moved along the length of the arm 26 to balance the total weight of the airplane body and its passengers in relation to the position of the roller 110.

The electric motor 115 may now be set into operation so as to lower the platform 114. The counterweight 124 will follow the platform 114 and so will the inner end of the arm 26. Thus, the outer end of the arm 26 will be moved upwards lifting the airplane body 37 to a suitable height. The revolving structure 28 may now be set turning and the passengers of the airplane body 37 may amuse themselves with aerial acrobatics by manipulating the controls of the airplane body, that is, by manipulating the ailerons 43, rudder 45, tail 44 etc.

While there has been illustrated and described the preferred embodiments of this invention, it is to be understood that it is not limited to the precise constructions herein disclosed and the right is reserved to all changes and modifications coming within the scope of the invention as defined in the appended claims.

Having thus described the invention, what is claimed as new, and desired to be secured by United States Letters Patent is:

1. In an apparatus for amusement and instruction in aviation, a revolving structure having a central post and a support radially spaced from said central post, a radially extending arm pivotally mounted intermediate of its ends on said support, a saddle coaxially turnably mounted on the outer end of said arm, an airplane body for passengers and provided with controls for aerial acrobacy such as banking, barrel turning, etc. and having a tube extending along its longitudinal axis in the vicinity of its center and said airplane body having at the front an electric motor driven propeller, means for rotatively supporting said tube at right angles to the outer end of said arm and through said saddle, and means for limiting pivoting of said arm for controlling ascending and descending of its outer end and thus of said airplane body, said saddle being provided with abutments engageable with brackets mounted on said arm for limiting turning of the saddle through a restricted annular distance.

2. In an apparatus for amusement and instruction in aviation, a revolving structure having a central post and a support radially spaced from said central post, a radially extending arm pivotally mounted intermediate of its ends on said support, a saddle coaxially turnably mounted on the outer end of said arm, an airplane body for passengers suspended from said saddle, means for automatically balancing said airplane body and its load about the pivot of said arm, said means for automatically balancing said airplane body and its load about the pivot of said arm including a weight slidably mounted to move along said arm, and means for moving said weight controlled with a reversible motor, and means for operating said motor in one direction or the other.

3. In an apparatus for amusement and instruction in aviation, a revolving structure having a central post and a support radially spaced from said central post, a radially extending arm pivotally mounted intermediate of its ends on said support, a saddle coaxially turnably mounted on the outer end of said arm, an airplane body for passengers, means for automatically balancing said airplane body and its load about the pivot of said arm, said means for automatically balancing said airplane body and its load about the pivot of said arm including a weight slidably mounted to move along said arm, and means for moving said weight controlled with a reversible motor, and means for operating said motor in one direction or the other, depending upon the position of the inner end of said arm.

4. In an apparatus for amusement and instruction in aviation, a revolving structure having a central post and a support radially spaced from said central post, a radially extending arm pivotally mounted intermediate of its ends on said support, a saddle coaxially turnably mounted on the outer end of said arm, an airplane body for passengers, means for automatically balancing said airplane body and its load about the pivot of said arm, said means for automatically balancing said airplane body and its load about the pivot of said arm including a weight slidably mounted to move along said arm, and means for moving said weight controlled with a reversible motor, and means for operating said motor in one direction or the other, depending upon the position of the inner end of said arm, relative to a bracket movably mounted on said central post.

5. In an apparatus for amusement and instruction in aviation, a revolving structure having a central post and a support radially spaced from said central post, a radially extending arm pivotally mounted intermediate of its ends on said support, a saddle coaxially turnably mounted on the outer end of said arm, an airplane body for passengers and provided with controls for aerial acrobacy such as banking, barrel turning, etc. and having a tube extending along its longitudinal axis in the vicinity of its center and said airplane having at the front an electric motor driven propeller, means for rotatively supporting said tube at right angles to the outer end of said arm and through said saddle, safety belts for said passengers, means for locking said airplane body from making barrel turns while said safety belts are loose, said means for locking said airplane body from making barrel turns including slidably mounted bolts through which said safety belts pass, means for tensioning said safety belts to move said bolts, and means for locking the airplane body to limited turning when said bolts are in normal positions.

6. In an apparatus for amusement and instruction in aviation, a revolving structure having a central post and a support radially spaced from said central post, a radially extending arm pivotally mounted intermediate of its ends on said support, a saddle coaxially turnably mounted on the outer end of said arm, an airplane body for passengers and provided with controls for aerial acrobacy such as banking, barrel turning, etc. and having a tube extending along its longitudinal axis in the vicinity of its center and said airplane having at the front an electric motor driven propeller, means for rotatively supporting said tube at right angles to the outer end of said arm and through said saddle, safety belts for said passengers, means for locking said airplane body from making barrel turns while said safety belts are loose, said means for locking said airplane body from making barrel turns including slidably mounted bolts through which said safety belts pass, means for tensioning said safety belts to move said bolts, and means for locking the airplane body to limited turning when said bolts are in normal positions, said means for tensioning said belts being controlled with manually turnable shafts.

TERESA A. VDA. DE CORTÉS,
*Executrix of the Estate of Rafael Ponce Cortés, Deceased.*